United States Patent [19]
Sosalia

[11] 3,785,441
[45] Jan. 15, 1974

[54] HINGE CONSTRUCTION
[75] Inventor: Harry Sosalia, Sac City, Iowa
[73] Assignee: Royal Industries, Inc., Pasadena, Calif.
[22] Filed: Nov. 1, 1971
[21] Appl. No.: 194,712

[52] U.S. Cl............... 172/311, 172/456, 280/411 R
[51] Int. Cl...................... A01b 19/04, A01b 73/00
[58] Field of Search .................................
    172/310–311, 313, 456; 280/411 R, 412;
    16/163, 166

[56] References Cited
UNITED STATES PATENTS

| 3,515,223 | 6/1970 | Youngberg et al. | 172/310 X |
| 3,190,367 | 6/1965 | Kopaska | 172/456 |
| 3,548,954 | 12/1970 | Lindemann | 172/311 |
| 941,040 | 11/1909 | Petri | 16/163 |
| 1,754,497 | 4/1930 | Boucher | 172/310 X |
| 1,522,675 | 1/1925 | Flom | 280/411 R |
| 1,693,992 | 12/1928 | Peterson | 16/163 |
| 2,055,013 | 9/1936 | Loenz | 280/411 R |
| 3,079,174 | 2/1963 | Oehler et al. | 280/412 |
| 3,529,674 | 9/1970 | Todd et al. | 172/311 |

FOREIGN PATENTS OR APPLICATIONS

| 502,040 | 3/1939 | Great Britain | 16/163 |

Primary Examiner—Robert E. Pulfrey
Assistant Examiner—Paul T. Sewell
Attorney—Axel A. Hofgren et al.

[57] ABSTRACT

An improved hinge construction for interconnecting frames of an agricultural implement of the type wherein the frames may be lowered to a work performing position or elevated to a transporting position in which position they are additionally folded with respect to each other. The hinge includes two pintles, one for each frame, which pintles journal an elongated hinge member. One of the pintles is affixed to its associated frame such that the elongated member may cant as well as pivot relative to the frame to provide a relatively full range of movement of one frame relative to the other whether in work performing position or transporting position over varying types of terrain.

5 Claims, 3 Drawing Figures

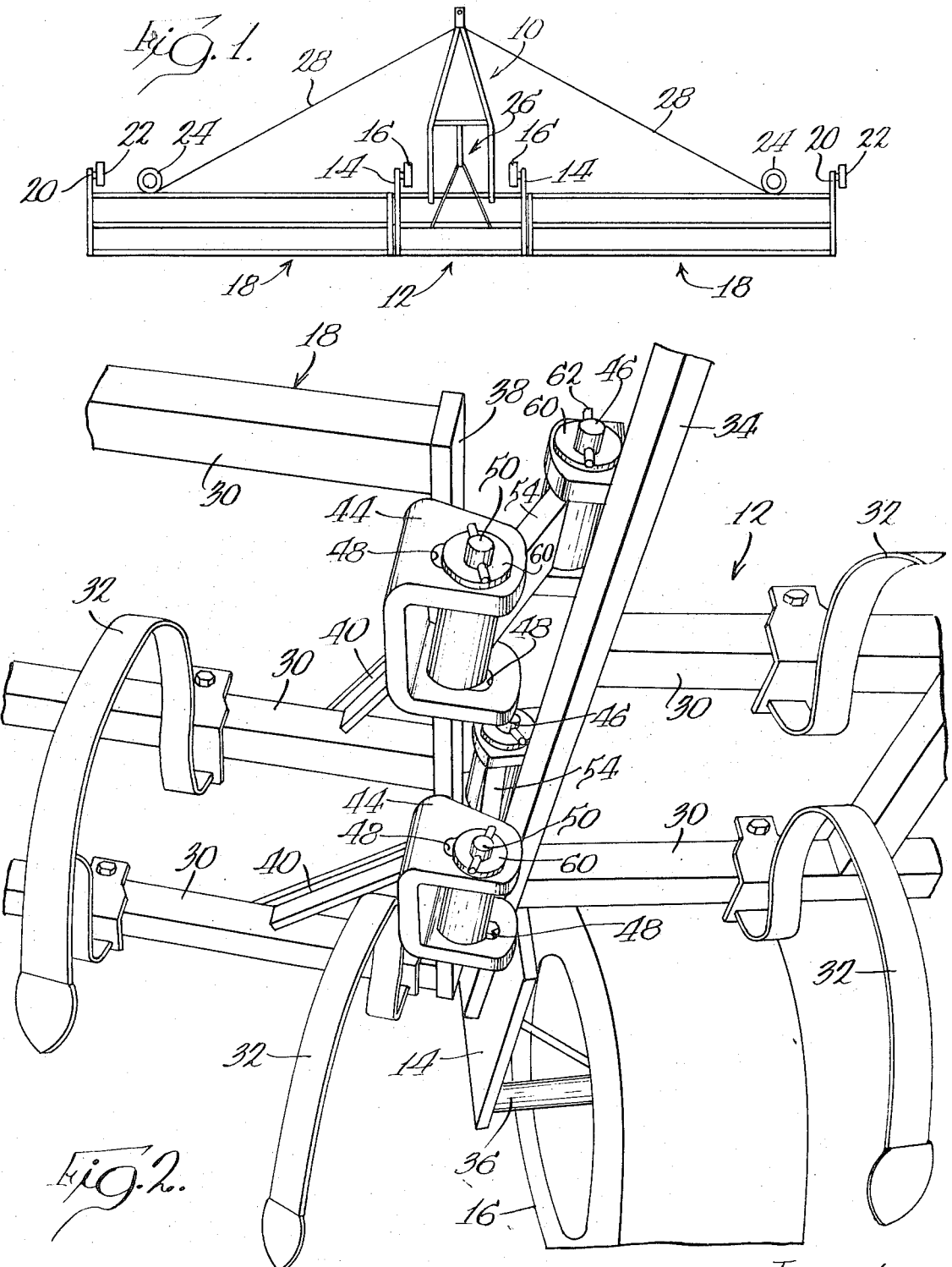

HINGE CONSTRUCTION

BACKGROUND OF THE INVENTION

This invention relates to agricultural implements, and more particularly, to improved hinge constructions for interconnecting the frames of multiple framed agricultural implements.

The movement in agriculture to larger scale operations has resulted in the increase in size of a number of agricultural implements such that various types of agricultural operations such as cultivating can be speeded up. That is, by reason of the use of larger sized implements, a given operation on a given sized field can be performed in a lesser amount of time than with smaller implements.

The increasing of the size of a number of implements has not been without attendant problems. For example, with larger implements, variations in terrain across a strip of land to be operated on will require that the implement be composed of several relatively movable frames to preclude the implement from getting hung up on a high spot or from failing to perform the desired operation on a low spot. Similarly, in fenced areas, difficulty may be experienced in moving the implement through a gate or the like. Finally, where it is necessary to tow the implement along a road to a point of use, extremely large implements present obvious traffic hazards.

As a result, constructions for a number of implements have evolved which, as mentioned previously, involve the use of multiple frames movably interconnected to each other. Quite frequently, the frames are mounted for movement between a field position wherein a work performing means mounted on the frame is in engagement with the ground to perform the desired agricultural operation and an elevated transport position wherein the work performing member is not in contact with the ground so that the implement may be towed to or from a point of use. To solve the problem of passing the implement through narrow gates or safely towing the same along a roadway, the connections between the frames are typically such that two side or wing frames may be towed rearwardly of a main frame and within a rearward projection of the width of the latter when all frames are in the second mentioned position above.

Hinge constructions for hingedly connecting the frames in such implements have not proved satisfactory in terms of providing the necessary range of relative movement of the frames with respect to each other whether in a work performing position or in a towing position and have been unable to meet the durability requirements obviously necessary in manufacturing reliable farm machinery. Thus, there is a real need for an improved hinge construction for interrelating frames of multiple framed farm implements.

SUMMARY OF THE INVENTION

It is the principal object of the invention to provide a new and improved farm implement of the multiple frame variety including new and improved hinge means for interconnecting the frames. More particularly, it is an object of the invention to provide a new and improved hinge construction that permits a wide range of relative movement between frames whether the frames are in a field position or in a transport position, over a variety of differing terrains and which is capable of withstanding the heavy stress conditions imposed upon the same during operation of the implement.

The exemplary embodiment of the invention achieves the foregoing object by means of a construction including a pair of U-shaped members which are adapted to be secured to adjacent frames in a farm implement in vertically offset positions when the frames are in a work performing position. Extending between the U-shaped members is an elongated member terminating in sleeves at each end, which sleeves are received between the legs of associated U-shaped members. Each of the U-shaped members includes aligned apertures in the legs for receiving a pintle which in turn passes through the sleeve of the associated end of the elongated member to journal the same in the U-shaped member. The apertures in one of the U-shaped members are in the form of elongated slots extending along the length of the legs so as to permit shifting movement of the pintle, and thus canting of the elongated member, relative to the frame to which the U-shaped member is secured. The opposite end of the elongated member mounts a stop means which is adapted to engage the blade of its associated U-shaped member so as to limit pivotal movement of the elongated member about the axis of one of the pintles.

Other objects and advantages will become apparent from the following specification taken in conjunction with the accompanying drawings.

DESCRIPTION OF THE DRAWINGS

FIG. 1 is a somewhat schematic plan view of an agricultural implement with which improved hinge means of the invention is intended to be used;

FIG. 2 is a perspective view of a portion of the agricultural implement illustrating the hinge means of the invention interconnecting two frames from the underside of the latter.

DESCRIPTION OF THE PREFERRED EMBODIMENT

Figure 3:
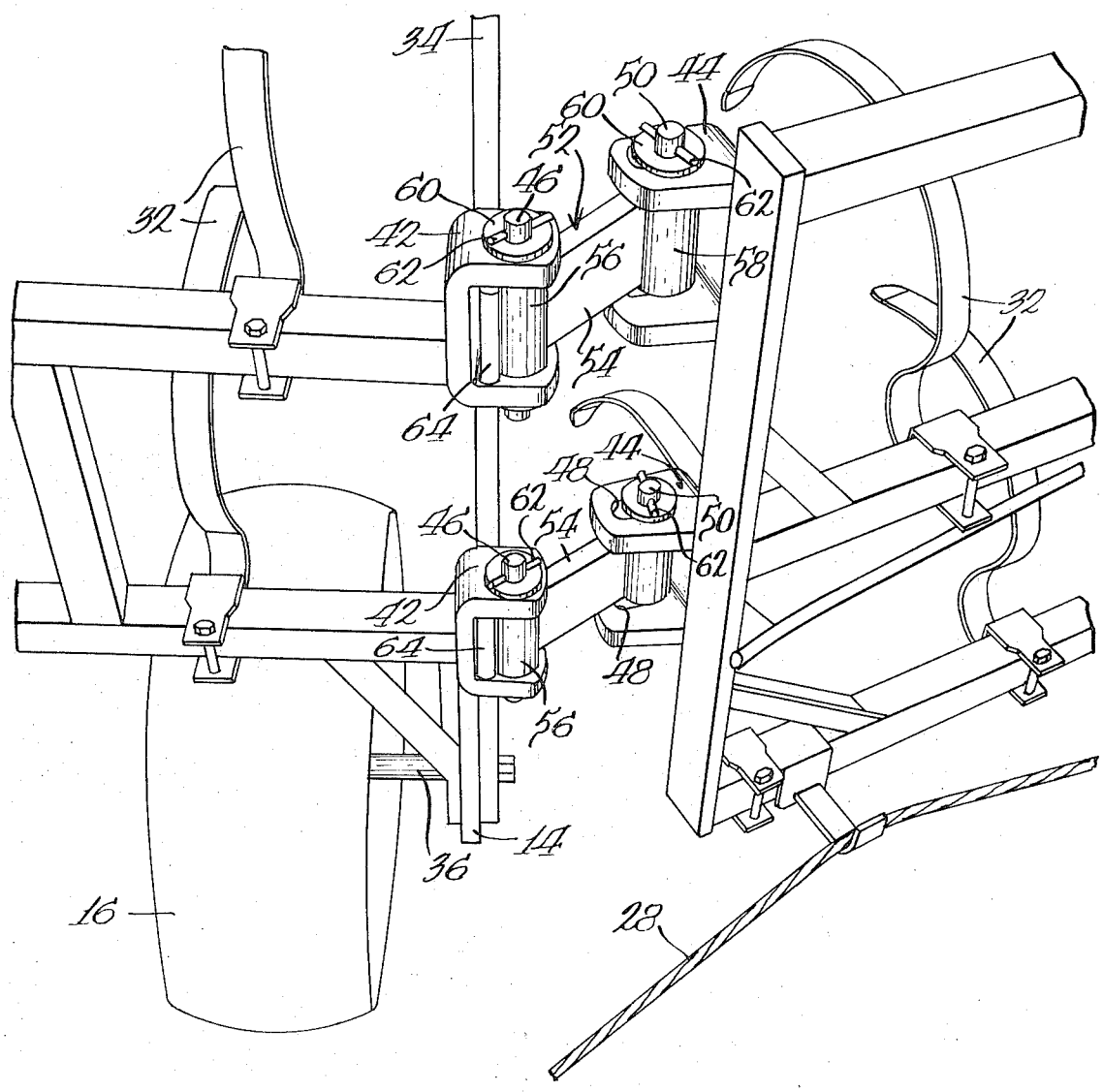
FIG. 3 is a perspective view of the hinge means of the invention interconnecting two frames of an agricultural implement from the upper side of the frames.

One form of an agricultural implement with which the invention is intended to be used is illustrated somewhat schematically in FIG. 1 and is seen to include a drawbar assembly, generally designated 10, which is adapted to be secured to a tractor or the like to pull the implement. Trailing the drawbar assembly 10 is a main frame, generally designated 12 which, at its forward end, is pivotally secured to the drawbar assembly 10 by means not shown. Side members of the main frame 12 include forward projections 14 which in turn mount wheels 16 on which the main frame 12 will be supported whether in a field position or in a transport position.

Flanking the main frame 12 is a pair of wing or side frames, generally designated 18, only one of which will be described since the two are mirror images of each other. Each wing frame 18 at its side remote from the main frame 12 includes a forwardly projecting member 20 mounting a wheel 22 which will be in contact with the ground when the frames are in the field position. The leading edge of each wing frame 18 additionally mounts a wheel 24 which serves to support the same when in the transport position. As is well-known, the orientation of the wheels 24 on the respective frames with respect to the wheels 22 is such that the latter will be out of engagement with the ground when the frames are in the transport position.

The drawbar assembly 10 is provided with an elevating mechanism, generally designated 26, of a conventional construction which is operative to rotate the main frame 12 from the position shown about 90° so that the same will be moved to the transport position. Hinge connections forming the subject of this invention between the main frame 12 and the wing frames 18 cause such movement of the main frame 12 to similarly rotate the wing frames 18 to move the wheels 22 out of engagement with the ground and the wheels 24 into engagement therewith.

Finally, cables 28 extend from the forward end of the drawbar assembly 10 very nearly to the outward extremities of the wing frames 18 and serve to maintain the side members of the wing frames 18 substantially parallel with the side members of the main frame 12 under load conditions in the field position. The cables 28 are, of course, released when movement of the wing frame 18 to the transport position is desired.

Turning now to FIG. 2, the connection between the main frame 12 and one of the wing frames 18 is illustrated in greater detail. As shown, both frames are in the transport position (although the wing frame 18 has not yet shifted to the rear of the main frame 12) and each includes a plurality of cross members 30 mounting spring teeth 32 for cultivating a field when the frames are in the field position. The construction of the spring teeth 32 form no part of the instant invention.

The main frame 12 includes a side member 34 including a forwardly extending plate defining the extension 14 from which an inwardly extending axle 36 projects to journal one of the wheels 16. The wing frame 18 also includes a side member 38 from which diagonal braces 40 may extend to the cross members 30.

Along the length of the side member 34 and above the same are a pair of U-shaped members 42 of relatively hefty construction and which are secured to the side member 34 in any suitable fashion as, for example, by welding. Generally similar U-shaped members 44 are secured to the underside of side member 38 along the length of the same. The members 42 and 44 differ from each other in that the former include aligned apertures in their legs (not shown) of a size just sufficient to snugly receive hinge pintles 46 while, as may be seen in both FIGS. 2 and 3, the U-shaped members 44 are provided with elongated slot-like apertures 48, the direction of elongation of the apertures 48 being along the length of the legs of the member 44. Like the apertures receiving the pintles 46, the slots 48 receive pintles 50 but, by reason of the elongated nature of the slots 48, the pintles 50 are free to cant as, for example, illustrated in FIG. 2.

An interconnection between the pintles 46 and 50 is established by an elongated member, generally designated 52, having a midportion formed of bar stock 54 or the like and having ends defined by sleeves 56 and 58 received in the members 42 and 44 respectively and through which the pintles 46 and 50 respectively extend. To insure retention of the pintles 46 and 50 in their respective apertures as well as in the sleeves 56 and 58, the outermost ends exteriorly of the members 42 and 44 are surrounded by conventional washers 60 in abutment with a retaining pin 62 passing through a bore in the end of each of the pintles 46 and 50.

Finally, the construction is completed by stop means located on the sleeves 56. According to the preferred embodiment, the stop means are in the form of rod stock 64 secured to the sleeves 56 as by welding in such a way that they may engage the bights of the U-shaped members 42 to limit rotative movement of the sleeves 56 about the pintles 46. Generally, the stop means 64 will be located almost directly oppositely on the sleeves 56 of the point at which the bar 54 is joined thereto.

In normal operation with the frames in the field position, when the apparatus is traversing level ground, the elongated members 52 will be vertically oriented with the side members 34 and 38 of the frames almost exactly parallel, being held in such a position by the cables 28. As terrain varies, the frames are free to pivot relative to each other about an axis extending parallel to the direction of movement and, if necessary, cant with respect to one another about a substantially vertical axis to a position wherein the side members 34 and 38 are non-parallel and, such flexibility of movement is also provided when the frames are in the transport position. For example, the pivots permit the wing frames 18, when in the transport position, to pivot rearwardly of the main frame to trail the same so that the effective width of the implement is no more than that of the main frame 12. And again, some canting movement of the side members 38 and 34 with respect to each other is permitted as, for example, illustrated in FIG. 2 when uneven terrain is encountered even during towing. Of course, the extent of the sleeves is less than the extent between the pair of legs of the U-shaped members 44 as is apparent in FIG. 2 in which corresponding ends of the pintles 50 are located at corresponding ends of the slots 48 and the opposite ends of the pintles 50 are located at the opposite ends of the slots 48.

I claim:

1. In an agricultural implement having a main frame adapted to be drawn by a tractor, at least one auxiliary frame, both of said frames mounting work performing means, plural hinge means hingedly interconnecting the two frames, and means whereby the frames are lowerable between a first position wherein the work performing means engage the ground to perform an agricultural operation and are elevatable a second position wherein the work performing means are out of contract from the ground so that one frame may be pivoted and thereby folded relative to the other for towing or the like, the improvement to allow canting between said frames wherein each said hinge means comprises: a first pintle mounted to one of said frames, a second pintle mounted on the remaining of said frames, said pintles being generally parallel to each other, and an elongated member impaled at its ends by said pintles, one of said pintles being mounted on its associated frame by a U-shaped bracket mounted on said associated frame, said U-shaped bracket including aligned, elongated slots in the pair of legs thereof for receiving said pintle, said elongated member being received between the pair of legs of said U-shaped bracket and having an extent less than the extent between said pair of legs to cause said one of said pintles to be loosely secured to one of its associated frame and to cant relative to said one associated frame and thereby allow canting between both of said frames.

2. The implement of claim 1 wherein said elongated member comprises a pair of generally parallel sleeves, each receiving an associated one of said pintles interconnected by a bar-like structure, and further including a stop means mounted on one of said sleeves for limiting pivotal movement of said elongated member about the axis of rotation established by one of said pintles.

3. The implement of claim 1 wherein said pintles are mounted on their respective frames to be vertically offset from one another when said frames are in said first position.

4. A hinge construction for securing two frames of an agricultural implement together for permitting relative movement and canting between the two frames during the performance of an agricultural operation as well as during movement of the two frames to and from a location at which the agricultural operation is to be performed, said hinge construction comprising: first and second U-shaped brackets, each adapted to be secured to a respective one of the frames, first and second elongated members extending between said first and second U-shaped brackets respectively and having their respective ends received between the pair of legs of said U-shaped brackets, said first elongated member having an extent less than the extent between a pair of legs which receive its respective ends; a pair of pintles, one for each U-shaped bracket, extending through the legs of its associated U-shaped bracket and journalling the associated end of said elongated member, said hinge means including a pair of elongated slots, one in each leg of said first U-shaped bracket and extending along the length thereof, said slots receiving the associated pintle to allow at least one end of said elongated member to move relative to the first U-shaped bracket in a direction substantially parallel to the length of the legs thereof and to cant relative to the first U-shaped bracket due to the extent of said first elongated member being less than the extent between the pair of legs with the pair of elongated slots therein.

5. The hinge of claim 4 further including stop means for limiting the rotation of said elongated member about the pintles of at least one of said U-shaped brackets, said stop means including a projection from one end of the elongated member adapted to engage the bight of the associated U-shaped member.

\* \* \* \* \*